United States Patent
Terada et al.

(10) Patent No.: US 7,922,395 B2
(45) Date of Patent: Apr. 12, 2011

(54) WHEEL BEARING DEVICE

(75) Inventors: Hiroki Terada, Shizuoka-ken (JP); Takayuki Norimatsu, Shizuoka-ken (JP)

(73) Assignee: NTN Corporation, Osaka-Fu (JP)

( * ) Notice: Subject to any disclaimer, the term of this patent is extended or adjusted under 35 U.S.C. 154(b) by 1082 days.

(21) Appl. No.: 11/319,801

(22) Filed: Dec. 29, 2005

(65) Prior Publication Data

US 2006/0165332 A1   Jul. 27, 2006

(30) Foreign Application Priority Data

Jan. 7, 2005 (JP) ................. 2005-002917

(51) Int. Cl.
*F16C 33/60* (2006.01)
*F16C 35/063* (2006.01)
*B60B 35/12* (2006.01)

(52) U.S. Cl. .................................. 384/544
(58) Field of Classification Search ........... 384/544, 384/510, 537
See application file for complete search history.

(56) References Cited

U.S. PATENT DOCUMENTS

| 2004/0120622 | A1 | 6/2004 | Tajima et al. | |
| 2005/0105840 | A1* | 5/2005 | Muranaka et al. | 384/544 |
| 2007/0081752 | A1* | 4/2007 | Kametaka et al. | 384/544 |

FOREIGN PATENT DOCUMENTS

| JP | 2000-110840 A | | 4/2000 |
| JP | 2003/97588 | * | 4/2003 |
| JP | 2003/118309 | * | 4/2003 |
| JP | 2003-136908 A | | 5/2003 |
| JP | 2004-299643 A | | 10/2004 |

* cited by examiner

*Primary Examiner* — William C Joyce
(74) *Attorney, Agent, or Firm* — Arent Fox LLP

(57) ABSTRACT

A wheel bearing device, in which a swaged portion of a wheel hub abuts against a shoulder portion of a joint outer ring, is provided to positively prevent a stick slip noise from being generated at the time of the vehicle being pulled away from a parked position. The wheel bearing device includes an outer ring having double rows of race surfaces formed on its inner circumference; a wheel hub having one of the double rows of race surfaces formed on its outer circumference; an inner ring press-fitted over a reduced diameter step portion of the wheel hub and having the other of the race surfaces formed on its outer circumference; and double rows of rollers interposed on the respective race surfaces between the outer ring and the wheel hub and between the outer ring and the inner ring. The wheel bearing device is configured such that an end portion of the reduced diameter step portion of the wheel hub is swaged to thereby integrate the wheel hub with the inner ring, and a joint outer ring of a constant velocity universal joint is fitted into an inner diameter of the wheel hub via torque transmission means, allowing the swaged portion of the wheel hub to abut the shoulder portion of the joint outer ring. The swaged portion of the wheel hub is left non-quenched, whereas the surface-hardened abutted portion of the shoulder portion of the joint outer ring has a surface roughness of Ra 5.0 or more.

2 Claims, 4 Drawing Sheets

WHEEL BEARING DEVICE

CROSS-REFERENCE TO RELATED APPLICATION

This application claims the priority of JP Application No. 2005-002917, filed Jan. 7, 2005, the entire specification, claims and drawings of which are incorporated herewith by reference.

BACKGROUND OF THE INVENTION

1. Field of the Invention

The present invention relates to a drive wheel bearing device for rotatably supporting a drive wheel (the front wheels of a front wheel drive vehicle, the rear wheels of a rear wheel drive vehicle, and all the wheels of a four wheel drive vehicle) with respect to the suspension of the vehicle.

2. Description of the Related Art

Vehicle wheel bearing devices are used for driven wheels and drive wheels. Various types of bearing devices have been suggested according to their respective applications. For example, FIG. 3 shows a drive wheel bearing device which mainly includes a wheel hub 1, an inner ring 2, double rows of rollers 3 and 4, an outer ring 5, and a constant velocity universal joint 6.

The wheel hub 1 has an outboard race surface 7 formed on its outer circumference surface and a wheel mounting flange 9 for mounting a wheel (not shown). The wheel mounting flange 9 has hub bolts 10 embedded at equal intervals along the circumference thereof to secure a wheel disc. There is also provided a reduced diameter step portion 12 on the outer circumference surface of the wheel hub 1. The inner ring 2 is fitted over the reduced diameter step portion 12, and an inboard race surface 8 is formed on the outer circumference surface of the inner ring 2.

The inner ring 2 is fitted to have an appropriate crimp margin to prevent creep. The outboard race surface 7 formed on the outer circumference surface of the wheel hub 1 and the inboard race surface 8 formed on the outer circumference surface of the inner ring 2 constitute double rows of race surfaces. The inner ring 2 is fitted over the reduced diameter step portion 12 of the wheel hub 1, and then the end portion of the reduced diameter step portion 12 of the wheel hub 1 is swaged outwardly. This causes a swaged portion 11 to prevent the inner ring 2 from dislodging, thereby allowing the inner ring 2 to be integrated with the wheel hub 1 and provide preload to a bearing portion 20.

The outer ring 5 is provided, on its inner circumference surface, with double rows of race surfaces 13 and 14 formed to oppose the race surfaces 7 and 8 of the wheel hub 1 and the inner ring 2. The outer ring 5 also has a vehicle body mounting flange 17 for mounting it to the vehicle body (not shown). The vehicle body mounting flange 17 is securely bolted to a knuckle joint extending from the suspension (not shown) of the vehicle body using a mount hole 19.

The bearing portion 20 includes a double row angular contact ball bearing, in which the rollers 3 and 4 are interposed between the race surfaces 7 and 8 formed on the outer circumference surfaces of the wheel hub 1 and the inner ring 2 and the race surfaces 13 and 14 formed on the inner circumference surface of the outer ring 5. In this arrangement, each row of the rollers 3 and 4 is held at equal intervals along the circumference by the respective retainers 21 and 22. At both the openings of the bearing portion 20, a pair of seals 23 and 24 is fitted into the inner diameter at the respective ends of the outer ring 5 so as to slidingly contact with the outer circumference surfaces of the wheel hub 1 and the inner ring 2. The seals 23 and 24 are provided to seal the respective annular spaces between the outer ring 5 and the wheel hub 1 and between the outer ring 5 and the inner ring 2, thereby preventing leakage of grease filled in the bearing portion 20 and intrusion of external moisture or foreign matters.

The constant velocity universal joint 6 is provided at one end of an intermediary shaft (not shown) which is part of a driveshaft. The joint 6 includes: a joint outer ring 15 having a track groove formed on its inner circumference surface; a joint inner ring (not shown) having a track groove formed on its outer circumference surface so as to oppose the track groove of the joint outer ring 15; and balls (not shown) incorporated between the track groove of the joint outer ring 15 and the track groove of the joint inner ring. The joint outer ring 15 includes a mouse portion 25 for receiving the joint inner ring and the balls, and a stem portion 27 which axially extends integrally from the mouse portion 25 and which has a serrated portion 26 on its outer circumference surface.

The stem portion 27 is inserted into a through hole of the wheel hub 1 to allow a shoulder portion 16 of the joint outer ring 15 to abut the swaged portion 11 of the wheel hub 1. Under this condition, a nut 30 is firmly screwed down on a male screw portion 29 formed on the end portion of the stem portion 27, thereby securing the constant velocity universal joint 6 to the wheel hub 1. The engagement of the serrated portion 26 formed on the outer circumference surface of the stem portion 27 with a serrated portion 28 formed on the inner circumference surface of the through hole allows for torque transmission.

The drive wheel bearing device may possibly generate a click-clack squeak noise or a so-called stick slip noise, e.g., when the vehicle starts to move, between the swaged portion 11 of the wheel hub 1 of the bearing portion 20 and the shoulder portion 16 of the joint outer ring 15 of the constant velocity universal joint 6.

At the time of the vehicle starting to move, this stick slip noise may be generated when rotational torque is loaded from the joint outer ring 15 of the constant velocity universal joint 6 to the wheel hub 1 of the bearing portion 20, which is stationary. More specifically, the rotational torque is transferred from the joint outer ring 15 to the wheel hub 1 via the serrated portions 26 and 28, and thus a twist of the joint outer ring 15 causes the shoulder portion 16 of the joint outer ring 15 to abruptly slide past the swaged portion 11 of the wheel hub 1. This sudden sliding results in the stick slip noise.

Several means for preventing the stick slip noise have been suggested. For example, one means is disclosed in Japanese Patent Laid-Open Publication No. 2003-97588 or 2003-118309, in which the end face of the shoulder portion 16 of the joint outer ring 15 is provided with bumps and dips or blasted by shot peening to provide an increased frictional resistance to the abutted portion between the swaged portion 11 of the wheel hub 1 and the shoulder portion 16 of the joint outer ring 15. Another means is also disclosed, e.g., in Japanese Patent Laid-Open Publication No. 2003-136908, in which the flat end face of the swaged portion 11 of the wheel hub 1 is provided with recessed grooves in which grease is filled, thereby providing a reduced frictional resistance to the abutted portion between the swaged portion 11 of the wheel hub 1 and the shoulder portion 16 of the joint outer ring 15.

The wheel bearing device of the type currently in vogue is configured such that the swaged portion 11 of the wheel hub 1 abuts the shoulder portion 16 of the joint outer ring 15. The aforementioned means are adapted to prevent the stick slip noise by providing an increased or conversely reduced frictional resistance to the abutted portion between the swaged portion 11 of the wheel hub 1 and the shoulder portion 16 of the joint outer ring 15. However, the applicant has experimentally found that for the current type of the wheel bearing device, the aforementioned means are not sufficiently enough to prevent the stick slip noise.

SUMMARY OF THE INVENTION

It is therefore an object of the present invention to positively prevent a stick slip noise from being generated, at the time of a vehicle starting to move, in a wheel bearing device which is configured to have a swaged portion of the wheel hub abutted against a shoulder portion of the joint outer ring.

The present invention is intended to apply to a wheel bearing device which includes: an outer ring having double rows of race surfaces formed on an inner circumference; an inner member having a wheel mounting flange at one end and double rows of race surfaces on an outer circumference, the inner member including a wheel hub and an inner ring; and double rows of rollers interposed on the respective race surfaces between the outer ring and the inner member. The wheel bearing device is configured such that an end portion of a reduced diameter step portion of the wheel hub is swaged to thereby integrate the wheel hub with the inner ring, and a joint outer ring of a constant velocity universal joint is fitted into an inner diameter of the wheel hub via torque transmission means, allowing the swaged portion of the wheel hub to abut the shoulder portion of the joint outer ring. Some wheel bearing device of this type has a wheel mounting flange on the outer circumference of the outer ring, and one of the double rows of race surfaces is formed on the outer circumference of the wheel hub.

The wheel bearing device according to the present invention is characterized in that the swaged portion of the wheel hub is left non-quenched, and the shoulder portion of the joint outer ring has a hardened surface, with the abutted surface of the shoulder portion having a surface roughness of Ra 5.0 or more. The abutted surface of the shoulder portion having a surface roughness of Ra 5.0 or less would unpreferably cause abrupt sliding to occur between the swaged portion of the wheel hub and the shoulder portion of the joint outer ring.

According to the present invention, the swaged portion of the wheel hub is left non-quenched, and the hardened abutted surface of the shoulder portion of the joint outer ring has a surface roughness of Ra 5.0 or more, thereby allowing the hardened abutted surface of the shoulder portion to be readily engaged with the non-quenched abutted surface of the swaged portion. As described above, at the time of the vehicle starting to move, rotational torque is loaded from the joint outer ring of the constant velocity universal joint to the wheel hub of the bearing portion, which is stationary. In this case, the inventive feature allows for preventing the stick slip noise without a twist of the joint outer ring causing the shoulder portion of the joint outer ring to abruptly slide past the swaged portion of the wheel hub. It is thus possible to provide improved quietness and thus eliminate unpleasant feeling of the driver of the vehicle.

DETAILED DESCRIPTION OF THE PREFERRED EMBODIMENTS

Figure 1:
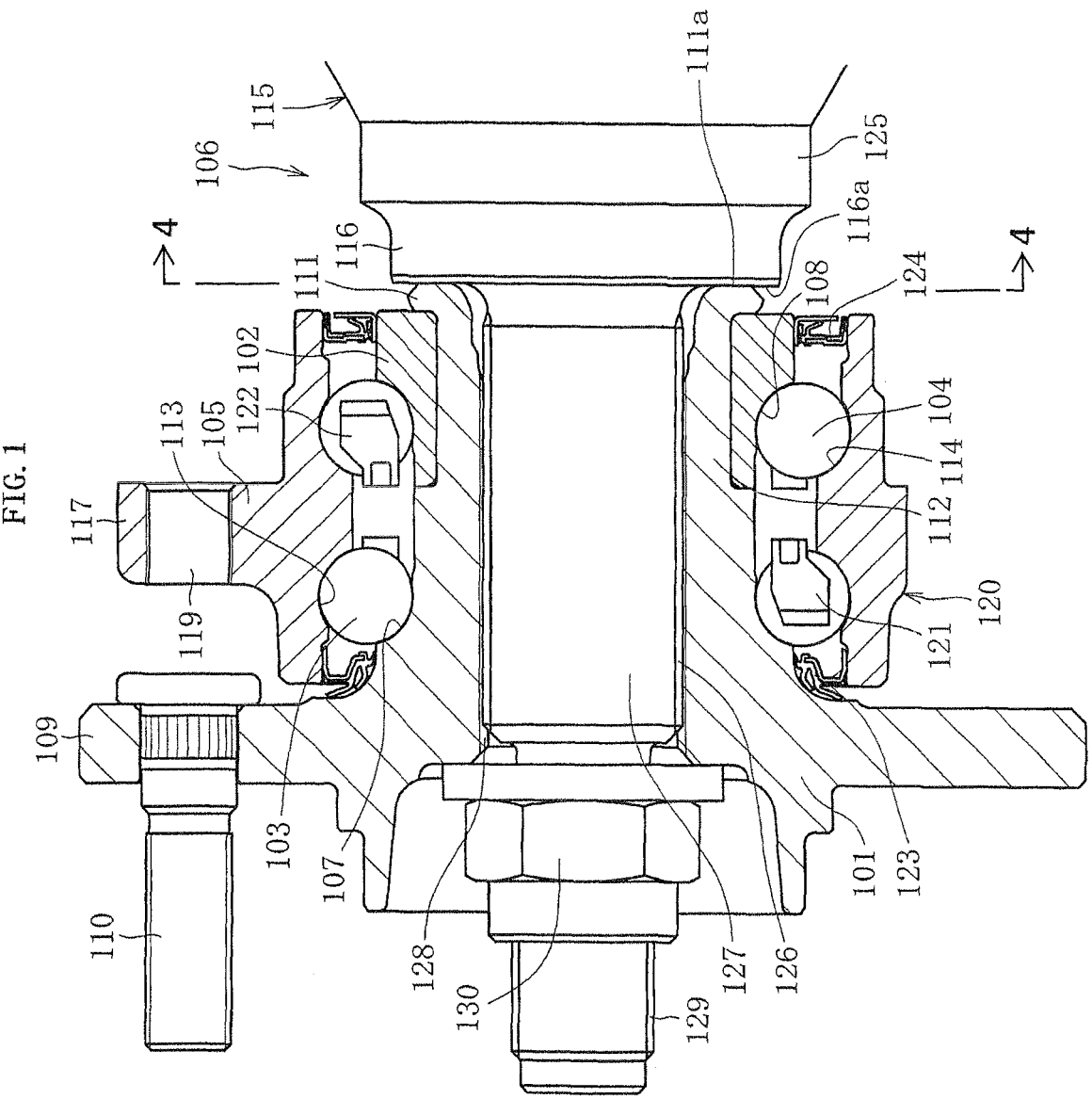
FIG. 1 is a sectional view showing a wheel bearing device according to an embodiment of the present invention.

FIG. 1 shows a drive wheel bearing device according to an embodiment, which mainly includes a wheel hub 101, an inner ring 102, double rows of rollers 103 and 104, an outer ring 105, and a constant velocity universal joint 106.

The wheel hub 101 has an outboard race surface 107 formed on its outer circumference surface and a wheel mounting flange 109 for mounting a wheel (not shown). The wheel mounting flange 109 has hub bolts 110 embedded at equal intervals along the circumference thereof to secure a wheel disc. There is also provided a reduced diameter step portion 112 on the outer circumference surface of the wheel hub 101. The inner ring 102 is fitted over the reduced diameter step portion 112, and an inboard race surface 108 is formed on the outer circumference surface of the inner ring 102.

The inner ring 102 is fitted to have an appropriate crimp margin to prevent creep. The outboard race surface 107 formed on the outer circumference surface of the wheel hub 101 and the inboard race surface 108 formed on the outer circumference surface of the inner ring 102 constitute double rows of race surfaces. The inner ring 102 is fitted over the reduced diameter step portion 112 of the wheel hub 101, and then the end portion of the reduced diameter step portion 112 of the wheel hub 101 is swaged outwardly. This causes a swaged portion 111 to prevent the inner ring 102 from dislodging, thereby allowing the inner ring 102 to be integrated with the wheel hub 101 and provide preload to a bearing portion 120.

The outer ring 105 is provided, on its inner circumference surface, with double rows of race surfaces 113 and 114 formed to oppose the race surfaces 107 and 108 of the wheel hub 101 and the inner ring 102. The outer ring 105 also has a vehicle body mounting flange 117 for mounting it to the vehicle body (not shown). The vehicle body mounting flange 117 is securely bolted to a knuckle joint extending from the suspension (not shown) of the vehicle body using a mount hole 119.

The bearing portion 120 includes a double row angular contact ball bearing, in which the rollers 103 and 104 are interposed between the race surfaces 107 and 108 formed on the outer circumference surfaces of the wheel hub 101 and the inner ring 102 and the race surfaces 113 and 114 formed on the inner circumference surface of the outer ring 105. In this arrangement, each row of the rollers 103 and 104 is held at equal intervals along the circumference by the respective retainers 121 and 122. At both the openings of the bearing portion 120, a pair of seals 123 and 124 is fitted into the inner diameter at the respective ends of the outer ring 105 so as to slidingly contact with the outer circumference surfaces of the wheel hub 101 and the inner ring 102. The seals 123 and 124 are provided to seal the respective annular spaces between the outer ring 105 and the wheel hub 101 and between the outer ring 105 and the inner ring 102, thereby preventing leakage of grease filled in the bearing portion 120 and intrusion of external moisture or foreign matters.

The constant velocity universal joint 106 is provided at one end of an intermediary shaft (not shown) which is part of a driveshaft. The joint 106 includes a joint outer ring 115 having a track groove formed on its inner circumference surface, a joint inner ring (not shown) having a track groove formed on its outer circumference surface so as to oppose the track groove of the joint outer ring 115, and balls (not shown) incorporated between the track groove of the joint outer ring 115 and the track groove of the joint inner ring. The joint outer ring 115 includes a mouse portion 125 for receiving the joint inner ring and the balls, and a stem portion 127 which axially extends integrally from the mouse portion 125 and which has a serrated portion 126 formed on its outer circumference surface.

The stem portion 127 is inserted into a through hole of the wheel hub 101 to allow a shoulder portion 116 of the joint outer ring 115 to abut the swaged portion 111 of the wheel hub 101. Under this condition, a nut 130 is firmly screwed down on a male screw portion 129 formed on the end portion of the stem portion 127, thereby securing the constant velocity universal joint 106 to the wheel hub 101. The engagement of the serrated portion 126 formed on the outer circumference surface of the stem portion 127 with a serrated portion 128 formed on the inner circumference surface of the through hole allows for torque transmission.

Figure 2A:
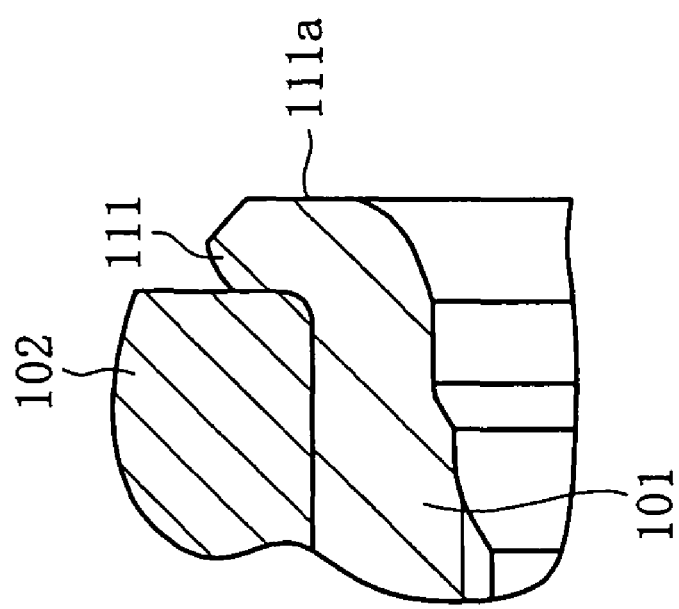
FIG. 2a is an enlarged sectional view showing the essential portion of a swaged portion of the wheel hub of FIG. 1.
Figure 2B:
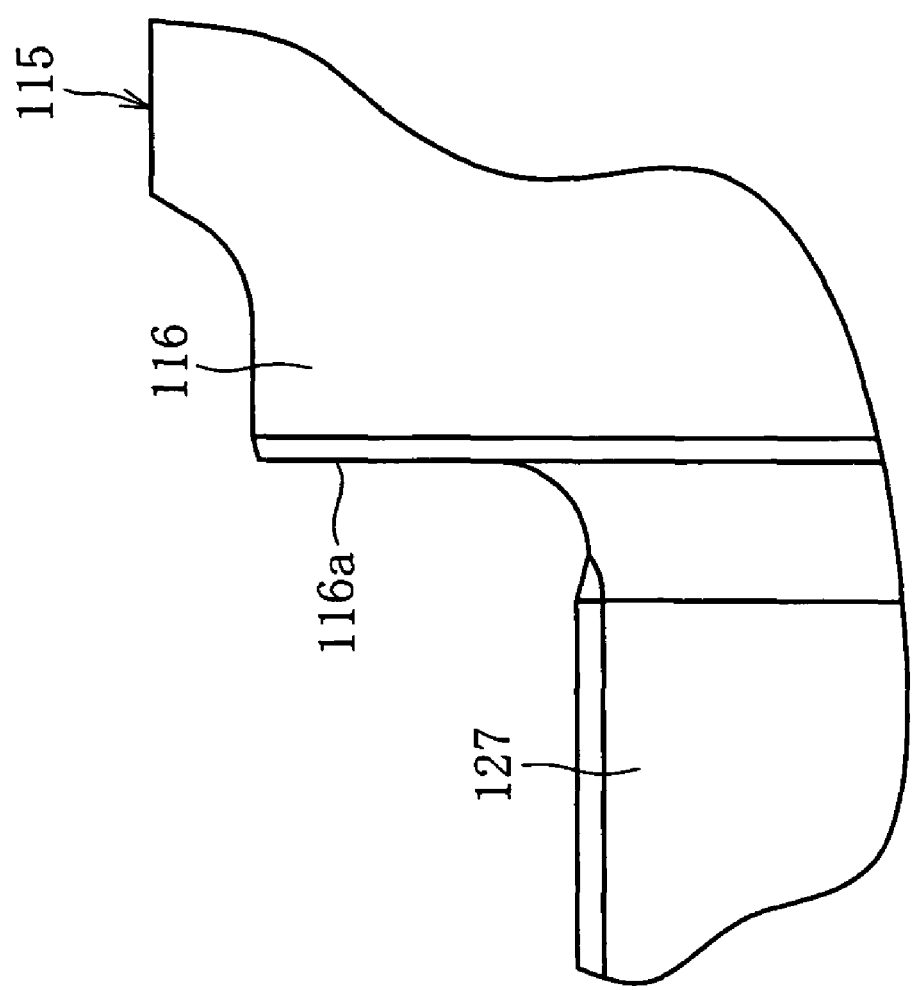
FIG. 2b is an enlarged sectional view showing the essential portion of a shoulder portion of a shoulder portion of the joint outer ring of FIG. 1.
Figure 3:
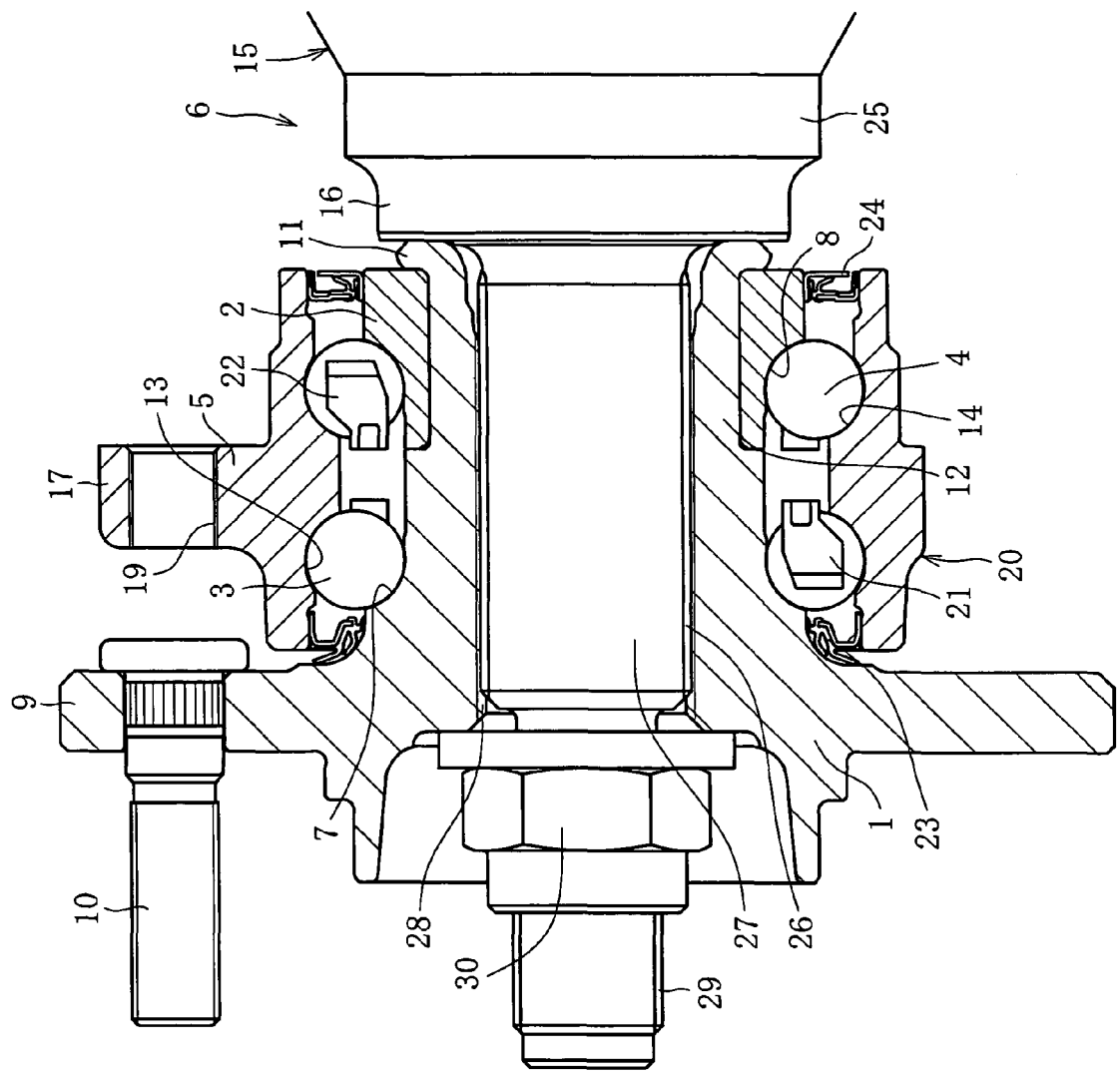
FIG. 3 is a sectional view showing an example of a conventional wheel bearing device.

In the bearing device according to this embodiment, the swaged portion 111 of the wheel hub 101 shown in FIG. 2a is left non-quenched to allow the end portion of the reduced diameter step portion 112 of the wheel hub 101 to be readily swaged. Additionally, an end face 116a of the shoulder portion 116 of the constant velocity universal joint 106 shown in FIG. 2b is allowed to abut the swaged portion 111 of the wheel hub 101 so as to secure the end portion of the stem portion 127 to the wheel hub 101 by the nut 130. Thus, the shoulder portion 116 has a hardened surface.

The non-quenched swaged portion 111 of the wheel hub 101 has an abutted surface 111a, and the surface-hardened shoulder portion 116 of the joint outer ring 115 has the abutted surface 116a. The abutted surface 116a of the shoulder portion 116 is adapted to have a surface roughness of Ra 5.0 or more. The surface roughness of Ra 5.0 or more at the abutted surface 116a of the shoulder portion 116 can be realized, e.g., by performing turning or by shot peening on the abutted surface 116a.

The applicant conducted experiments under the conditions that the abutted surface 111a of the swaged portion 111 of the wheel hub 101 has a surface roughness of Ra 2.0, and the abutted surface 116a of the shoulder portion 116 of the joint outer ring 115 has a surface roughness of Ra=4.0, 5.1, 6.1, and 8.5. The experiments showed that at Ra=4.0 and with a load torque of 350 N·m, there was a small stick slip noise, whereas at Ra=5.1, 6.1, and 8.5, no stick slip noise was produced. In the experiments, the abutted surface 116a of the shoulder portion 116 preferably has a surface roughness of Ra 8.0 or less due to the limit of machinability.

Figure 4:
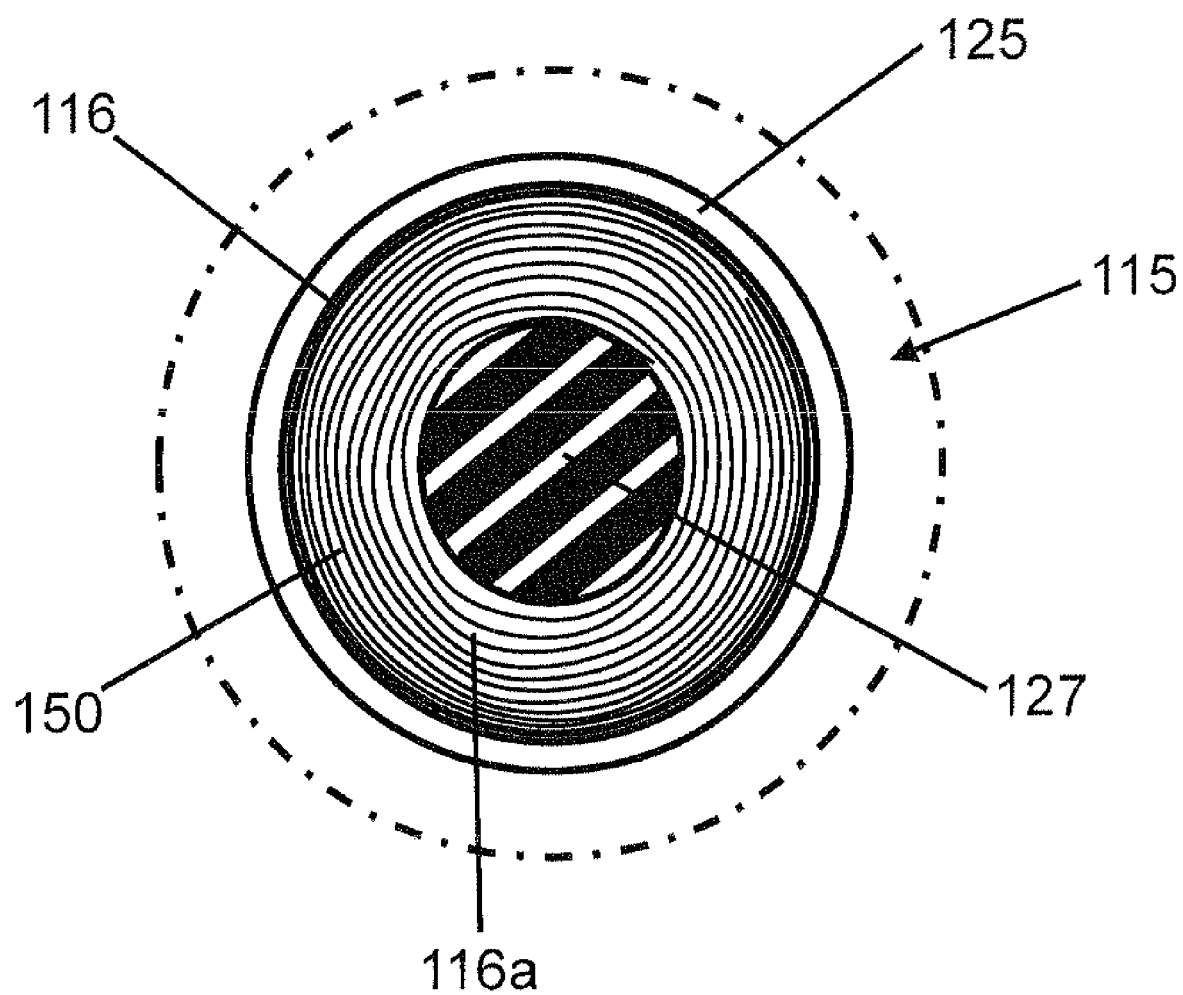
FIG. 4 is a sectional view taken along section line 4-4 of FIG. 1 showing a surface roughness of the abutted surface as realized by spiral turning, in accordance with aspects of the present invention.

To provide a surface roughness to the abutted surface 116a of the shoulder portion 116 by turning, the abutted surface 116a is effectively provided with spiral cuts 150, as shown in FIG. 4, concentric cuts, or crossed cuts. In the turning, a cutting tool is fed preferably 0.6 mm or less per one revolution. A feed rate of 0.6 mm or greater would unfavorably ensure a desired surface roughness with difficulty.

According to this embodiment, the swaged portion 111 of the wheel hub 101 is left non-quenched, and the surface-hardened abutted surface 116a of the shoulder portion 116 of the joint outer ring 115 has a surface roughness of Ra 5.0 or more. This allows the surface-hardened abutted surface 116a of the shoulder portion 116 to be readily engaged with the non-quenched abutted surface 111a of the swaged portion 111. At the time of the vehicle starting to move, rotational torque is loaded from the joint outer ring 115 of the constant velocity universal joint 106 to the wheel hub 101 of the bearing portion 120, which is stationary. In this case, the aforementioned feature allows for preventing the stick slip noise without a twist of the joint outer ring 115 causing the shoulder portion 116 of the joint outer ring 115 to abruptly slide past the swaged portion 111 of the wheel hub 101.

What is claimed is:

1. A wheel bearing device comprising:
   an outer ring having double rows of race surfaces formed on an inner circumference;
   an inner member having a wheel mounting flange at one end and double rows of race surfaces on an outer circumference, the inner member including a wheel hub and an inner ring; and
   double rows of rollers interposed on the respective race surfaces between the outer ring and the inner member, an end portion of a reduced diameter step portion of the wheel hub being swaged to thereby integrate the wheel hub with the inner ring, a joint outer ring of a constant velocity universal joint being fitted into an inner diameter of the wheel hub via torque transmission means, allowing the swaged portion of the wheel hub to abut the shoulder portion of the joint outer ring,
   wherein the swaged portion of the wheel hub is left non-quenched, and the shoulder portion of the joint outer ring has a hardened surface, with the abutted surface of the shoulder portion provided with spiral cuts by turning and having a surface roughness of Ra 5.0 or more, and
   wherein the spiral cuts of the hardened abutted surface of the shoulder portion are engaged with the non-quenched abutted surface of the swaged portion.

2. A wheel bearing device according to claim 1, having a wheel mounting flange on the outer circumference of the outer ring, and wherein one of the double rows of race surfaces is formed on the outer circumference of the wheel hub.

* * * * *